United States Patent Office 3,163,089
Patented Dec. 29, 1964

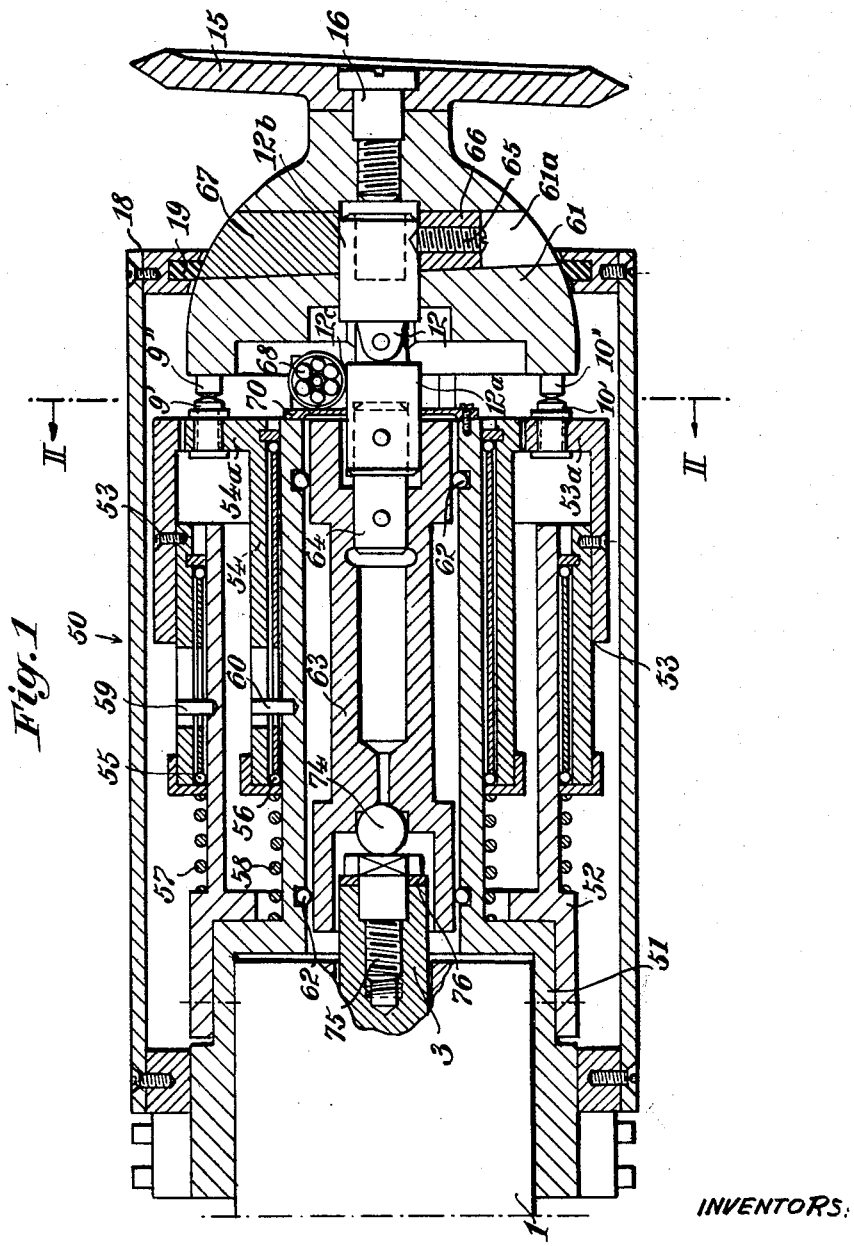

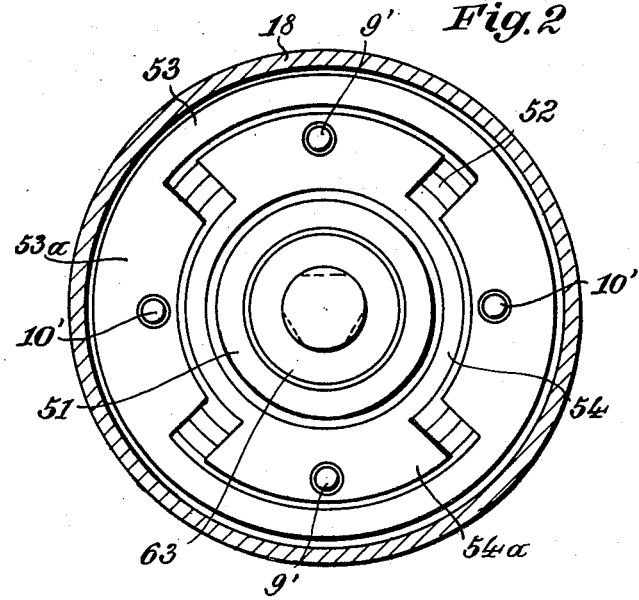
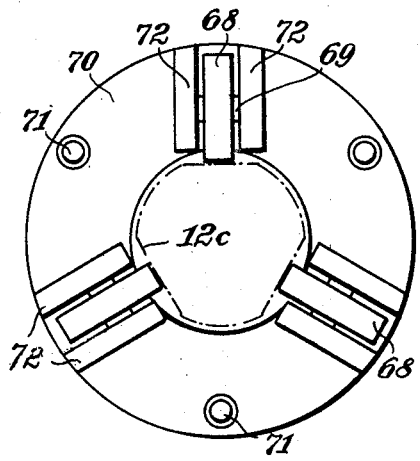
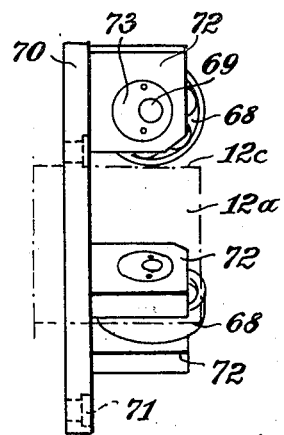
Inventors
E. Hermanns, E. von der Linde and E. Weber

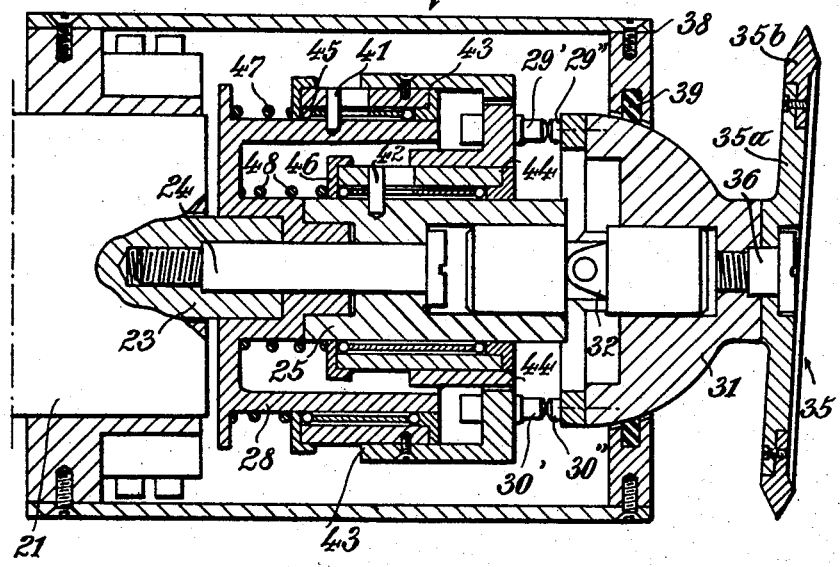

3,163,089
TRACER FOR COPYING THREE-DIMENSIONAL SURFACES
Erich Hubert Hermanns, Rheydt, Ekkehard von der Linde, Rheydt-Odenkirchen, and Ewald Weber, Rheydt, Germany, assignors to Maschinenfabrik Froriep G.m.b.H., Rheydt, Germany, a firm
Filed Aug. 14, 1961, Ser. No. 131,258
Claims priority, application Germany Aug. 30, 1960
8 Claims. (Cl. 90—62)

The invention relates to a tracer for copying three-dimensional surfaces, especially the surfaces of Kaplan turbine blades, water and air propellers or the like.

For producing mechanical parts with spatially curved surfaces by chip removal on machine tools, a pattern is used having the shape of the part to be produced and over which a tracer runs. When following the shape of the pattern, the tracer controls the movements between the tool and the workpiece to be machined in such a manner that the workpiece is cut to the desired shape; this can be effected, for example, with the aid of amplifiers and servo-motors. Thereby the tracer is also always readjusted accordingly on the pattern.

The object of the invention is to provide a tracer for copying three-dimensional or spatial surfaces which is characterized by the practical design and arrangement of its parts and by its reliable operation in every respect.

Another object of the invention is to provide a tracer for copying spatial surfaces with which it is possible to obtain a high degree of accuracy when copying.

Yet another object of the invention is the production of a tracer for copying spatial surfaces in which the elements serving to control swinging movements are arranged separately from the elements for controlling the movements in axial direction.

Another object of the invention is the production of a tracer for copying spatial surfaces in which a variation in the speed of its movement takes place automatically as the tracer approaches to the pattern.

According to the invention, the tracing device consists of a main tracer which carries a tracer pin for axial movements and can be of known construction, and an auxiliary tracer connected to the main tracer for influencing the same and which has a swivel tracer plate and a carrier for switching or controlling members actuated by the swinging of the tracer plate.

The tracer plate is preferably detachably mounted on a part of the auxiliary tracer capable of swinging in all directions at an inclination in relation to the tracer axis corresponding to the drop of the copying tool, for example a milling cutter, actually required. The inclination of the tracer plate can also be changed easily by means of wedge-shaped shims or gibs or the like and adjusted as required. The swivel part carrying the tracer element is preferably in the form of a spherical cup on which a packing fitted on the housing of the tracer can then slide.

The tracer plate itself can be composed of one or several parts. In particular, it may consist of a, for example, circular middle part of specifically light material and an outer, for example, ring-shaped part of wear-resistant material which is connected to the middle part by screws or the like. It is likewise possible to make the tracer plate almost as small as possible at the same time changing the copying ratio, thereby increasing the accuracy of work considerably in as far as it is dependent upon the tracer.

The switching or controlling members arranged on the carrier of the auxiliary tracer may be electric, hydraulic or pneumatic structural elements, according to the type of copying system employed.

In an advantageous construction of the tracer, sets of contacts coordinated to each other in pairs can be provided as switching members for the swinging movements, one contact of a set being always mounted on a swivel part carrying the tracer plate and the companion contact fixed on a spring-loaded part slidable on the carrier of the auxiliary tracer. For controlling swinging movements about two axes at right angles to each other two pairs of contact sets are used which are located on the two sides of the tracer axis on two diameters of the tracer at right angles to each other. At the same time the arrangement is preferably such that the contacts of the pairs of contact sets for the swinging movement about one axis are individually shiftable on the carrier of the auxiliary tracer against spring force independently of the contacts of the pair of contact sets for the swinging movement about the other axis.

A practical form of construction of the tracer according to the invention consists in that the auxiliary tracer is fixed on the tracer pin of the main tracer. Apart from the advantage of a central guiding of the command emitting movements there is also the advantage of simple and easy fitting. As already mentioned, a conventional tracer can be used as main tracer, for example a tracer for copying contours.

In another form of construction, which can also be obtained by the simple combination of a main tracer and an auxiliary tracer and which is capable of meeting very exacting demands as regards accuracy, the auxiliary tracer is fitted with its carrier on a stationary part of the main tracer and, for influencing the main tracer according to the pressure of the tracer element in the direction of the tracer axis, has an operating member arranged between the swivel tracer element and the tracer pin of the main tracer and is guided to slide axially in the carrier. This construction is particularly advantageous when small duplicating tolerances have to be kept. At the same time a very sturdy construction is obtained by mounting the carrier on the housing or casing of the main tracer.

According to another feature of the invention, the auxiliary tracer is equipped with an advance cutout for switching over from the movement bringing the tracer to the pattern at top speed to a slower feed movement. In a practical form of construction an axially shiftable, spring-loaded rod is provided which has a recess for actuating a roller switch of conventional type or for actuating some other switching element and which is equipped with adjustable rings for setting the switching points.

Other features and advantages of the invention will become apparent from the embodiments of the invention hereinafter described by way of example with reference to the accompanying drawings, in which FIG. 1 is a longitudinal section through an auxiliary tracer combined with a main tracer, wherein several parts below the central longitudinal axis are shown displaced through an angle of 90°;

FIG. 2 is a section taken on line II—II of FIG. 1, wherein the joint and the parts cooperating therewith are omitted for the sake of clearness;

FIG. 3 an end view of a flange with ring grooved bearings;

FIG. 4 a side elevation of the flange shown in FIG. 3;

FIG. 5 a longitudinal section through a modified form of construction of the tracer, some of the parts below the longitudinal center axis being shown displaced through an angle of 90°, and FIG. 6 a side elevation of a tracer equipped with an advance cutout switch.

The main tracer 1, only partly shown in the drawing, which can be of conventional design, has an axially shiftable tracer pin 3 held under initial stress by springs or the like not shown in the drawing. The main tracer may be for example of the type as manufactured by the firm Heid, residing in Vienna, Austria. The tracer pin of the main tracer, in moving in axial direction, for example towards the left in FIG. 1, actuates switching or controlling members which are located in the main tracer housing and cause the relative movement always necessary between the tool and the workpiece, by means of further known arrangements, as is customary in copying systems. The members actuated by the main tracer pin are preferably electric contacts which are arranged at a suitable place of the main tracer. As the internal structure of such an instrument can be designed in the usual manner, it has not been shown specially. Any conventional tracer can be used which has a tracer pin for the axial movements and suitable control members actuated by the tracer pin.

The auxiliary tracer, designated as a whole by the reference 50, comprises a carrier 51 constructed in the form of a sleeve, the rear portion of which is slipped on to the casing of the main tracer 1, for example of cylindrical shape and is held thereon. It can be held either by a suitable tight fit between the two parts or the carrier 51 may also be fixed on the main tracer by screws or the like. The front portion of the carrier 51 is of reduced diameter. It also has a sleeve-like part 52 extending forward and firmly connected to it by a suitable fit or by screws. Connections between two parts effected by screws or the like are indicated by dot-dash lines on the drawings. Differing from the construction illustrated, the parts 51 and 52 might also be made in one piece.

Two sleeves 53 and 54 are arranged concentrically to the axis of the tracer and composed of several parts to facilitate manufacture and assemblage, are slidably mounted on the parts 51 and 52 by means of roller bearings 55 and 56 and loaded by two spiral springs 57 and 58 of which the spring 57 bears against a shoulder on the part 52 and the spring 58 against a shoulder of the part 51. These sleeves are secured against rotation by means of pins 59 and 60 set in the carrier parts 51 and 52 and extending through slots in the sleeves 53 and 54 and in parts of the antifriction bearings 55 and 56. The sleeves 53, 54 form carriers for contacts for controlling the swinging movements and, for this purpose, have on their front ends bent-over parts 53a and 54a in which contacts 9' and 10' are fitted. The construction is such that on the sleeve 53 there are two opposite inwardly directed bent-over parts or lugs 53a and on the sleeve 54 likewise two diametrically opposite but outwardly directed lugs or bent-over parts 54a, two lugs on one sleeve being each located between two lugs of the other sleeve in circumferential direction (FIG. 2). In order to make this arrangement clear also in FIG. 1, the section through the sleeves 53 and 54 in the lower part of FIG. 1 is shown displaced through an angle of 90° in relation to the section in the upper part of the figure. The contacts 10' located on one diameter therefore belong to the sleeve 53 while the contacts 9' located on a diameter at right angles thereto belong to the sleeve 54. The counter contacts 9" and 10" are located on a hemispherical part 61 of the carrier for the tracer element which, in the construction illustrated, is in the form of a plate tracer 15. Each contact forms with its counter contact a contact set 9', 9" and 10', 10" respectively, so that there are two pairs of contact sets situated on diameters at right angles to each other, all the contact sets being at the same distance from the axis of the tracer.

The auxiliary tracer is protected against the penetration of foreign bodies by a housing 18 on the front end of which a packing 19 is provided which slides on the surface of the hemispherical carrier 61 carrying the tracer plate 15.

A rod-shaped operating member 63 is axially shiftable in the interior of the carrier 51 and guided by means of balls 62 or other suitable bearings. This member is connected at its front end to a pin 64 which engages in the sleeve-shaped rear part 12a of a universal joint 12. The front part 12b of the universal joint is inserted in a bore in the tracer plate carrier 61 and fixed by means of a screw 65. This screw is screwed into a sleeve 66 which is fitted in a wedge-shaped aperture 61a in the tracer plate carrier extending transversely to the axis of the tracer. At its opposite end the aperture 61a is closed by means of an insertion 67. The tracer plate 15 is fixed on the hemispherical carrier by means of a cylindrical headed fitting screw 16. The tracer plate 15 is at an incline to the tracer axis which corresponds to the desired drop of the copying tool, for example a milling cutter or a grinding wheel. The inclination of the tracer plate can be varied if desired also by washers or discs ground in wedge-shape or the like. Instead of a universal joint in the form of a conventional shaft joint, a ball joint or some other Cardan joint may be provided.

According to the invention, the actuating member itself or the part of the universal joint fixed thereto has several flattened races on which rotary parts such as rollers held by the carrier run, so as to prevent in this manner the tracer plate carrier from turning about its axis. In the advantageous construction illustrated, the tracer plate carrier 61 held by the front part 12b of the universal joint is secured against rotation by three rolling bearings in the form of annular grooved bearings 68 displaced through an angle of 120° in relation to each other. These grooved antifriction bearings 68 run on flattened race surfaces 12c formed on the rear part 12a of the universal joint also displaced through an angle of 120° in relation to each other. The annular grooved bearings 68 are carried by a flange 70 fixed on the end of the carrier 51 by means of screws which engage through holes 71 provided in the flange (see FIGS. 3 and 4). Each of the bearings 68 is located between two forwardly projecting cheeks 72 of the flange 70, each cheek being provided with an aperture and a part 73 therein eccentrically mounting the axles 69 and capable of being turned and fixed so as to provide an eccentric support to enable the grooved bearings to be accurately adjusted in relation to their races on the universal joint. Just as in FIG. 2 the part 12a of the universal joint provided with the races 12c is indicated in dot-dash lines in FIGS. 3 and 4. By this arrangement unimpeded axial displacement of the universal joint with the tracer plate carrier can take place while it is impossible for it to turn about its axis. The flange 70 fixed by screws on the carrier 51 is drawn inwards so far that it forms, in an advantageous manner, an abutment for the operating member 63, with the result that the path of movement of this member and also of the tracer plate carrier 61 connected to it by the universal joint and acted upon by the springs 57 and 58 through the intermediary of the contacts 9', 9", 10', 10", is limited in forward direction.

According to another feature of the invention, there is only a force-locking connection between the operating member of the auxiliary tracer and the tracer pin of the main tracer. The tracer pin 3 of the main tracer 1, being under initial stress or pre-loaded, can in the simplest case bear directly against a surface of the operating member when at least one of the contacting surfaces is domed. In the advantageous construction illustrated, the operating member 63 is shaped at its rear end so that it surrounds the tracer pin 3 of the main tracer with a considerable amount of play. A steel ball 74 is pressed into a bore of the operating member and serves for transmitting the pressure forces in axial direction in that it bears against the flattened end face of a screw bolt 75 screwed into the tracer pin 3. As a result, a perfect axial transmission of force is obtained between the operating member 63 and the tracer pin 3, irrespective of any eccentric or angular displacement between the auxiliary tracer and the main tracer. A washer or spacer ring 76 is provided between the end face of the tracer pin 3 and the head of the screw bolt 75. By changing the thickness of this washer or ring, the distance between the tracer pin 3 and the operating member 63 can be adjusted to suit requirements. When the operating member 63 bears against the abutment formed by the flange 70 or some other suitable means, a perfect regulation of the initial stress of the pin of the main tracer is obtained, for example in the position on a first switching contact located in it, so that the contact system is therefore maintained free from play. Instead of a bolt screwed into the tracer pin 3, some other abutment member may be provided for changing the distance between the tracer pin and the operating member.

When in operation the tracer plate 15, due to its Cardan connection, can always adjust itself to the spatially curved surface of the pattern to be run over or scanned, whereby the contacts are actuated according to the direction of swing. Apart therefrom, the forces in axial direction are transmitted to the main tracer, that is the conventional main tracer is influenced in dependency upon the pressure of the tracer plate in direction of the tracer axis, whereas the switching members of the auxiliary tracer can operate independently thereof. The movements initiated by the contacts between the tool and the workpiece on the machine tool can be produced with known means and arrangements, so that it is unnecessary to describe them in detail. Similarly the electric circuits in which the contacts are arranged are not shown specially as these can be disposed with their cables in any suitable manner.

The tracer may, for example, be used when a swing movement is carried out by the tool in a vertical plane in which the tool axis lies and a second swinging movement is carried out in a plane at right angles or perpendicular to the first plane, by a turntable carrying the workpiece. It is, however, also possible to allow both swinging movements to be carried out by the tool if this is capable of swinging in all directions.

When all contacts of the auxiliary tracer are closed, no swinging movements can be carried out between the workpiece and the tool. If, during the working operation, a contact is opened by the tracer plate swinging in one direction due to the curvature of the pattern surface, the tool and tracer are moved in the direction in question until the set of contacts again closes. The contacts are connected to the controlling arrangement in such a manner that opposite contacts are always coordinated to a swinging movement. The direction of swing is dependent upon which of the two sets of contacts always comprising a pair is operated, in such manner that this set is again closed by the swinging movement. The sleeve 53 with the contacts 10' of one pair of contact sets is shiftable against the action of the spring 57 and the sleeve 54 with the contacts 9' of the other pair of contact sets is also shiftable against the action of spring 58. Consequently, if in the event of sets is closed and the other is open, the contact sets belonging to the other pair positively remain closed. Therefore by actuating one set of contacts of a pair of contact sets the other pair of contact sets cannot be influenced. However, in the event of the tracer plate swinging in another direction, it is possible to obtain a desired simultaneous actuation of contact sets of both pairs of contact sets.

In FIG. 5 a further construction of the tracer according to the invention is illustrated. This differs from the construction shown in FIG. 1 substantially in that the auxiliary tracer, which is here designated as a whole by the reference 20, is fixed with its carrier on the tracer pin 23 of the main tracer 21 by means of a cylindrical headed fitting screw 24. The carrier consists of a part 28 and a part 25 forming so-to-speak the tracer pin of the auxiliary tracer. Here there are two axially slidable sleeves 43 and 44 arranged concentrically to the tracer axis and mounted by means of roller bearings 45 and 46, which sleeves are supported on the part 28 by means of spiral springs 47 and 48 and secured against rotation by pins 41 and 42.

The sleeves 43 and 44 also serve as contact carriers and are so constructed that contacts 29' and 30' are arranged on two vertical diameters on the front part of each sleeve in such manner that all the contacts lie in a circle. For the sake of clearness, in the lower part of FIG. 5 the sleeve 43 as well as the sleeve 44 are shown turned through an angle of 90° in relation to the part of the figure located above the longitudinal center axis. The arrangement corresponds in principle to that shown in FIG. 2. The counter contacts 29" and 30" are mounted on a hemispherical cup 31 which is Cardan-connected to the part 25 of a conventional universal joint 32 and on which the tracer plate 35 is detachably fixed at an incline to the drop of the milling machine by means of a cylindrical headed fitting screw 36. The tracer plate 35 in this construction consists of a middle part 35a of specifically light material and an outer ring-shaped part 35b of wear-resisting material fixed to the middle part by means of screws or the like and which comes into contact with the surface of the pattern. It is evident that such a tracer plate can also be provided in the embodiment shown in FIG. 1. The tracer is covered by a housing which has a packing 39 bearing against the hemispherical part 31.

Another form of construction of the auxiliary tracer which is not illustrated separately, consists in that the carrier of the auxiliary tracer fitted either on a stationary part of the main tracer or on the tracer pin of the main tracer has only a single sleeve shiftable against spring action and on which four contacts corresponding to the contacts 9', 10' respectively 29', 30' for the swinging movements are fixed for example by means of a ring. When the tracer plate swings, always three contact sets are in the majority of cases opened when a set of contacts is held closed. Such a construction is of particularly simple design. In the electric circuit of the control, however, precaution must be taken that two sets of contacts coordinated to each other do not initiate commands when they are both open.

In the form of construction illustrated in FIG. 6, the auxiliary tracer is provided in an advantageous manner with an advance cutout. In two brackets 77 fixed on the housing of the auxiliary tracer 50 for example by means of screws 78, a switch rod 79 is axially shiftable, this rod being rounded in lenticular cup-shape and having a recess, that is a part 80 of smaller diameter. This part 80 serves for actuating a conventional roller switch 81 which is mounted on a plate 84 connected to the brackets 77 by means of screws 83 and its roller 82 runs on the rod 79. A spring 85 surrounding the rod bears at one end against the front bracket 77 and at its rear end against a set collar 86. A second set collar 87 on the rear end of the rod limits the movement of the rod in forward direction. Therefore the switching point and also the spring force can be accurately set by means of the set collars.

The roller switch 81 serves for controlling the relative movements between the tool and the workpiece or tracer and pattern and for switching over from rapid motion to slow feed and belongs to the control system for the said movements. If the tracer travels in rapid motion in the direction towards the pattern the rounded front end of the rod 79 first comes into contact with the pattern, that is before the tracer plate, and is thus pressed back towards the rear. As soon as the roller 82 of the switch 81 drops into the recessed part 80 of the rod, the switching over to slower feed motion takes place.

What we claim is:

1. A tracer for copying three-dimensional surfaces, particularly the surfaces of Kaplan turbine blades, water and air propellers and the like, said tracer comprising in combination with a main tracer; an auxiliary tracer comprising a carrier having a portion mounted upon said main tracer, two coaxial sleeves movable relatively to the first-mentioned portion, resilient means engaging said sleeves and an operating member enclosed by said sleeves, a tracer plate adapted to engage the surface being traced and extending at an incline to the tracer axis, another carrier, means removably connecting said tracer plate to the second-mentioned carrier, means swingably connecting the second-mentioned carrier with said operating member, said coaxial sleeves having alined end surfaces, the second-mentioned carrier having an end surface located opposite said alined surfaces, and pairs of controlling contacts, the contacts of each pair being located opposite each other upon one of said alined surfaces and the end surface of the second-mentioned carrier respectively and being adapted to engage during the swinging movements of the second-mentioned carrier.

2. A tracer in accordance with claim 1, wherein said tracer plate has a middle part of specifically light material and an outer ring-shaped part of wear-resisting material.

3. A tracer for copying three-dimensional surfaces, particularly the surfaces of Kaplan turbine blades, water and air propellers and the like, said tracer comprising in combination with a main tracer; an auxiliary tracer comprising a carrier having a portion mounted upon said main tracer, another portion movable relatively to the first-mentioned portion and a spring between said two portions, a tracer plate adapted to engage the surface being traced, a carrier carrying said tracer plate, means swingably connecting the second-mentioned carrier with the second-mentioned portion of the first-mentioned carrier, said second-mentioned portion and said second-mentioned carrier having opposed surfaces, and pairs of controlling contacts, the contacts of each pair being located opposite each other upon said surfaces and being adapted to engage during the swinging movements of the second-mentioned carrier.

4. A tracer for copying three-dimensional surfaces, particularly the surfaces of Kaplan turbine blades, water and air propellers and the like, said tracer comprising in combination with a main tracer having an axially shiftable tracer pin; an auxiliary tracer comprising a member mounted upon said tracer pin, a tracer plate adapted to engage the surface being traced, a carrier carrying said tracer plate, means swingably connecting said carrier with said member, said member and said carrier having opposed surfaces, and opposed controlling contacts carried by said surfaces and adapted to engage during the swinging movements of said carrier.

5. A tracer in accordance with claim 4, comprising an advance cutout having a switch rod provided with a recess, means connecting said switch rod with said auxiliary tracer, a roller switch adapted to engage said recess, a spring engaging said switch rod, and set collars carried by said switch rod.

6. A tracer for copying three-dimensional surfaces, particularly the surfaces of Kaplan turbine blades, water and air propellers and the like, said tracer comprising in combination with a main tracer having a casing and an axially shiftable tracer pin; an auxiliary tracer comprising a carrier having a portion mounted upon said casing, an axially shiftable rod-shaped operating member adapted to press against said tracer pin, at least one movable sleeve enclosing said operating member and a spring engaging said sleeve; a tracer plate adapted to engage the surface being traced, a carrier carrying said tracer plate, means swingably connecting the second-mentioned carrier with said operating member, said sleeve and the second-mentioned carrier having opposed surfaces, and opposed controlling contacts carried by said surfaces and adapted to engage during the swinging movements of the second-mentioned carrier.

7. A tracer in accordance with claim 6, comprising means carried by said tracer pin for varying the distance between said tracer pin and said operating member.

8. A tracer for copying three-dimensional surfaces, particularly the surfaces of Kaplan turbine blades, water and air propellers and the like, said tracer comprising in combination with a main tracer having a casing and an axially shiftable tracer pin; an auxiliary tracer comprising a carrier having a portion mounted upon said casing, an axially shiftable rod-shaped operating member adapted to press against said tracer pin, at least one movable sleeve enclosing said operating member and a spring engaging said sleeve; a tracer plate adapted to engage the surface being traced, a carrier carrying said tracer plate, a universal joint connecting the second-mentioned carrier with said operating member and having flattened race surfaces, annular bearings engaging said race surfaces and the first-mentioned portion of the first-mentioned carrier, said sleeve and the second-mentioned carrier having opposed surfaces, and opposed controlling contacts carried by said surfaces and adapted to engage during the swinging movements of the second-mentioned carrier.

References Cited in the file of this patent

UNITED STATES PATENTS

| | | |
|---|---|---|
| 2,424,031 | Heer | July 15, 1947 |
| 2,826,966 | Lamielle | Mar. 18, 1958 |
| 2,839,733 | Bassett | June 17, 1958 |

FOREIGN PATENTS

| | | |
|---|---|---|
| 224,493 | Australia | Oct. 14, 1959 |